United States Patent
Lin (10) Patent No.: US 11,368,948 B2
(45) Date of Patent: Jun. 21, 2022

(54) TRANSMISSION CONFIGURATION INDICATION SWITCHING PROCEDURE IN NEW RADIO MOBILE COMMUNICATIONS

(71) Applicant: MediaTek Inc., Hsinchu (TW)

(72) Inventor: Hsuan-Li Lin, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/862,563

(22) Filed: Apr. 30, 2020

(65) Prior Publication Data

US 2020/0351842 A1    Nov. 5, 2020

Related U.S. Application Data

(60) Provisional application No. 62/842,635, filed on May 3, 2019.

(51) Int. Cl.
*H04B 7/08* (2006.01)
*H04W 72/04* (2009.01)
*H04W 24/10* (2009.01)

(52) U.S. Cl.
CPC .......... *H04W 72/042* (2013.01); *H04B 7/086* (2013.01); *H04W 24/10* (2013.01)

(58) Field of Classification Search
CPC .... H04W 72/042; H04W 24/10; H04B 7/086; H04B 7/088; H04L 5/0053; H04L 5/0048
USPC .......................... 375/267, 347; 455/101, 132
See application file for complete search history.

(56) References Cited

U.S. PATENT DOCUMENTS

| | | | |
|---|---|---|---|
| 2019/0082456 A1* | 3/2019 | Kim | H04L 1/1854 |
| 2019/0215701 A1* | 7/2019 | Honglei | H04L 1/1848 |
| 2019/0222289 A1* | 7/2019 | Wilson et al. | H04L 5/0073 |
| 2019/0229161 A1* | 7/2019 | Hou | H01L 51/0005 |
| 2019/0254045 A1* | 8/2019 | Sadiq | H04B 7/0617 |
| 2019/0296956 A1* | 9/2019 | Wilson et al. | H04L 5/0048 |
| 2019/0313429 A1* | 10/2019 | Cheng | H04W 72/042 |
| 2020/0014444 A1* | 1/2020 | Mueck | H04B 7/0408 |
| 2020/0077395 A1* | 3/2020 | Guo | H04W 72/0446 |
| 2020/0112974 A1* | 4/2020 | Sun | H04B 7/0695 |
| 2020/0229161 A1* | 7/2020 | Raghavan | H04L 5/0091 |
| 2021/0378045 A1* | 12/2021 | Zhang | H04L 5/0096 |

OTHER PUBLICATIONS

China National Intellectual Property Administration, International Search Report and Written Opinion for PCT/CN2020/088308, dated Jul. 21, 2020.
Catt, Further discussion on TCI state switching requirements, 3GPP TSG-RAN4 #90bis Meeting, R4-1903226, Xi'an, China, Apr. 8-12, 2019.
Catt, CR on TCI state switching delay, 3GPP TSG-RAN4 Meeting #90bis, R4-1903227, Xi'an, China, Apr. 8-12, 2019.

(Continued)

*Primary Examiner* — Syed Haider
(74) *Attorney, Agent, or Firm* — Han IP PLLC; Andy M. Han (57) ABSTRACT

An apparatus receives, from a wireless network, a transmission configuration indication (TCI) switch command to switch to a target TCI state. The apparatus determines a period based on whether a condition with respect to the target TCI state is met. The apparatus then completes switching to the target TCI state within the period.

7 Claims, 6 Drawing Sheets

(56) References Cited

OTHER PUBLICATIONS

Qualcomm Inc., Delay Requirements for active TCI state switch for PDCCH and PDSCH, 3GPP TSG-RAN4 Meeting #90bis, R4-1904334, Xi'an, China, Apr. 8-12, 2019.
Intel, AdHoc Minutes for Signal Characteristics, 3GPP TSG-RAN4 Meeting #90bis, R4-1904782, Xi'an, China, Apr. 8-12, 2019.
Taiwan Intellectual Property Office, Office Action for Taiwan Patent Application No. 109114535, dated Mar. 10, 2021.
3GPP, 3rd Generation Partnership Project; Technical Specification Group Radio Access Network; NR; Requirements tor support of radio resource management (Release 15), 3GPP TS 38.133 V15.5.0 (Mar. 2019).
Intel Corporation, On TCI State Switch Delay, 3GPP TSG-RAN WG4 Meeting #90, R4-1900111, Athens, Greece, Feb. 25-Mar. 1, 2019.
Catt, Discussion on TCI state switching requirements, 3GPP TSG-RAN4#90 Meeting, R4-1900473, Athens, Greece, Feb. 25-Mar. 1, 2019.

* cited by examiner

TRANSMISSION CONFIGURATION INDICATION SWITCHING PROCEDURE IN NEW RADIO MOBILE COMMUNICATIONS

CROSS REFERENCE TO RELATED PATENT APPLICATION

The present disclosure is part of a non-provisional patent application claiming the priority benefit of U.S. Provisional Patent Application No. 62/842,635, filed on 3 May 2019, the content of which being incorporated by reference in its entirety.

TECHNICAL FIELD

The present disclosure is generally related to mobile communications and, more particularly, to a transmission configuration indication (TCI) switching procedure in New Radio (NR) mobile communications.

BACKGROUND

Unless otherwise indicated herein, approaches described in this section are not prior art to the claims listed below and are not admitted as prior art by inclusion in this section.

A transmission configuration indication (TCI) state is dynamically transmitted by a serving cell of a mobile network (e.g., $5^{th}$-Generation (5G)/New Radio (NR) mobile network) to a user equipment (UE) and includes configuration(s) such as, for example, quasi-co-location (QCL) relationships between downlink (DL) reference signals (RSs) (e.g., in one channel state information reference signal (CSI-RS) set) and physical downlink shared channel (PDSH) demodulation reference signal (DMRS) ports of the antenna of the UE. The UE can be configured with a list of up to a given number of TCI-state configurations within the higher layer parameter PDSCH-Config to decode PDSCH according to a detected physical downlink control channel (PDCCH) with downlink control information (DCI) intended for the UE and the serving cell. Each TCI-state configuration can contain parameters for configuring a QCL relationship between one or two DL RSs and the DMRS ports of the PDSCH, the DMRS port of PDCCH, or the CSI-RS port(s) of a CSI-RS resource.

For the $3^{rd}$ Generation Partnership Project (3GPP) specification for NR, it has been agreed that, for the UE to perform a TCI switching procedure to switch from a current TCI state to a target TCI state, the target TCI state needs to be detectable during a TCI state switching period. However, it remains to be defined on how the network and the UE can have the same understanding on timing with respect to when the updated TCI state is to be applied.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to a novel TCI switching procedure.

Under various proposed schemes in accordance with the present disclosure, both a network and a UE would have the same understanding with respect to the timing for applying the updated TCI, thereby allowing the UE to receive data with proper beamforming.

In one aspect, a method may involve a processor of an apparatus receiving, from a wires network, a TCI switch command to switch to a target TCI state. The method may also involve the processor determining a period based on whether a condition with respect to the target TCI state is met. The method may further involve the processor completing switching to the target TCI state within the period.

In one aspect, an apparatus may include a transceiver and a processor coupled to the transceiver. The transceiver may be configured to communicate with a wireless network. The processor may receive, via the transceiver, from the wires network a TCI switch command to switch to a target TCI state. The processor may determine a period based on whether a condition with respect to the target TCI state is met. The processor may then complete switching to the target TCI state within the period.

It is noteworthy that, although description provided herein may be in the context of certain radio access technologies, networks and network topologies such as 5G/NR, the proposed concepts, schemes and any variation(s)/derivative(s) thereof may be implemented in, for and by other types of radio access technologies, networks and network topologies such as, for example and without limitation, LTE, LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to a TCI switching procedure in mobile communications. According to the present disclosure, a number of possible solutions may be implemented separately or jointly. That is, although these possible solutions may be described below separately, two or more of these possible solutions may be implemented in one combination or another.

Figure 1:
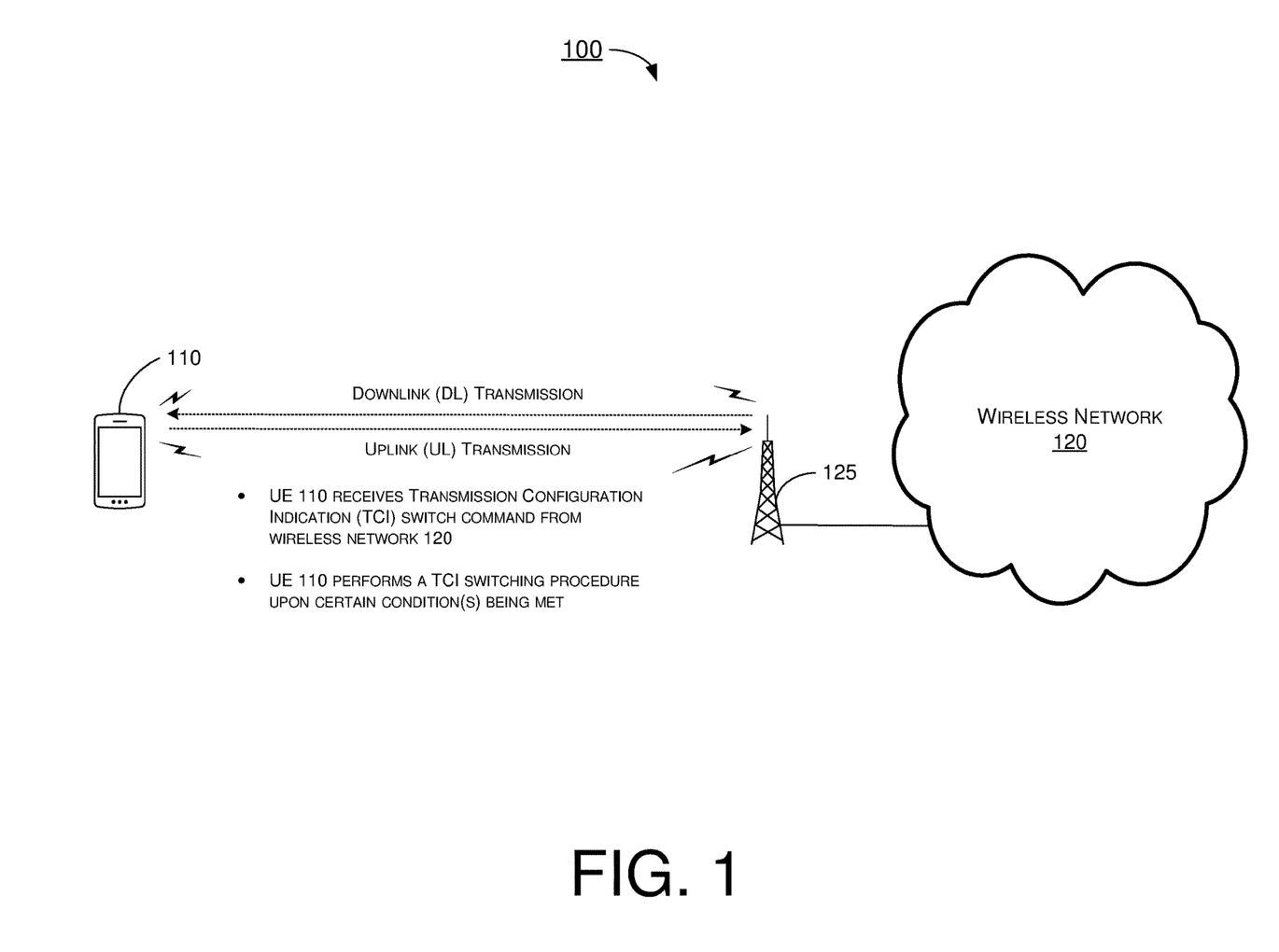
FIG. 1 is a diagram of an example network environment in which various solutions and schemes in accordance with the present disclosure may be implemented.
Figure 2:
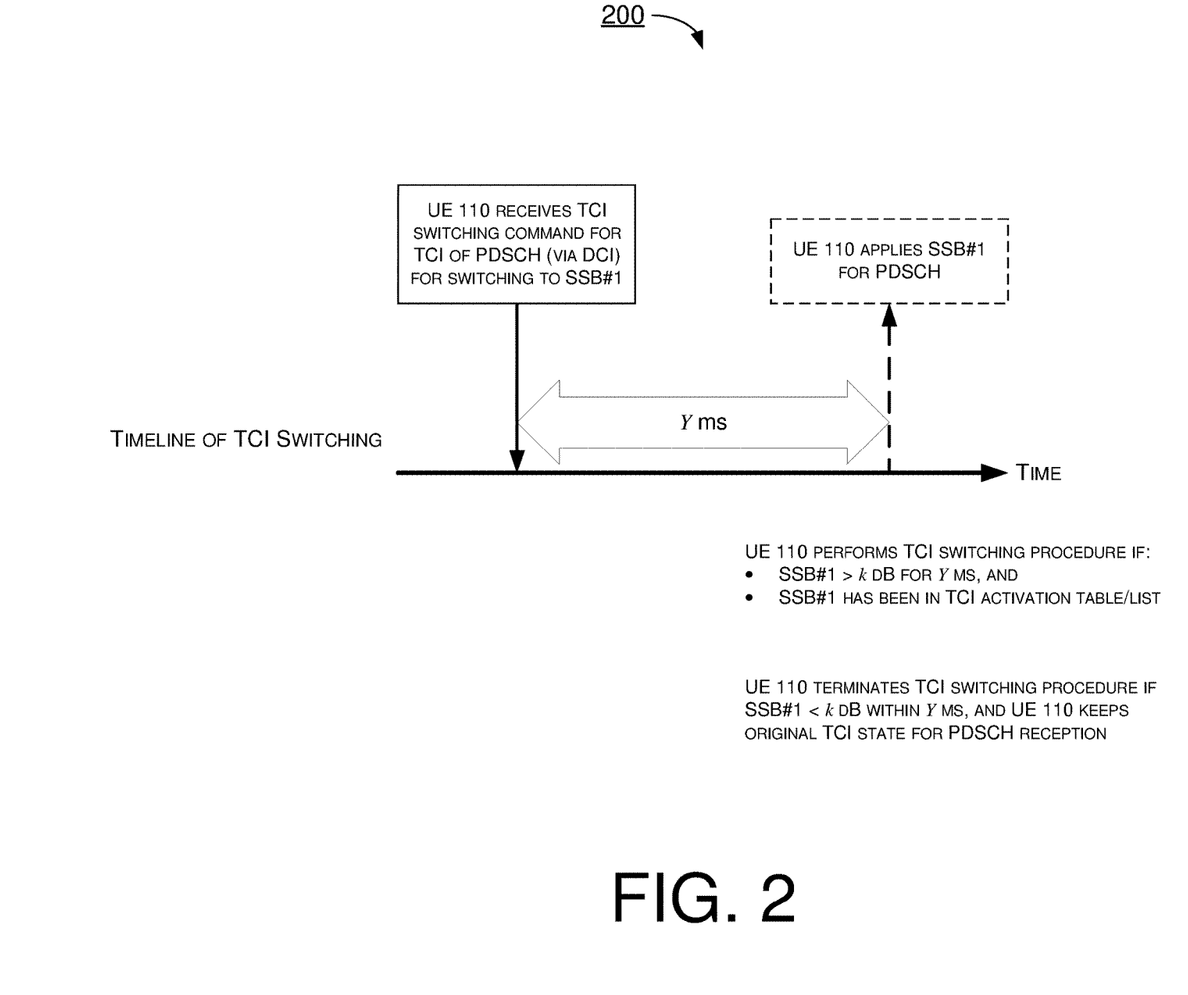
FIG. 2 is a diagram of an example scenario in accordance with an implementation of the present disclosure.
Figure 3:
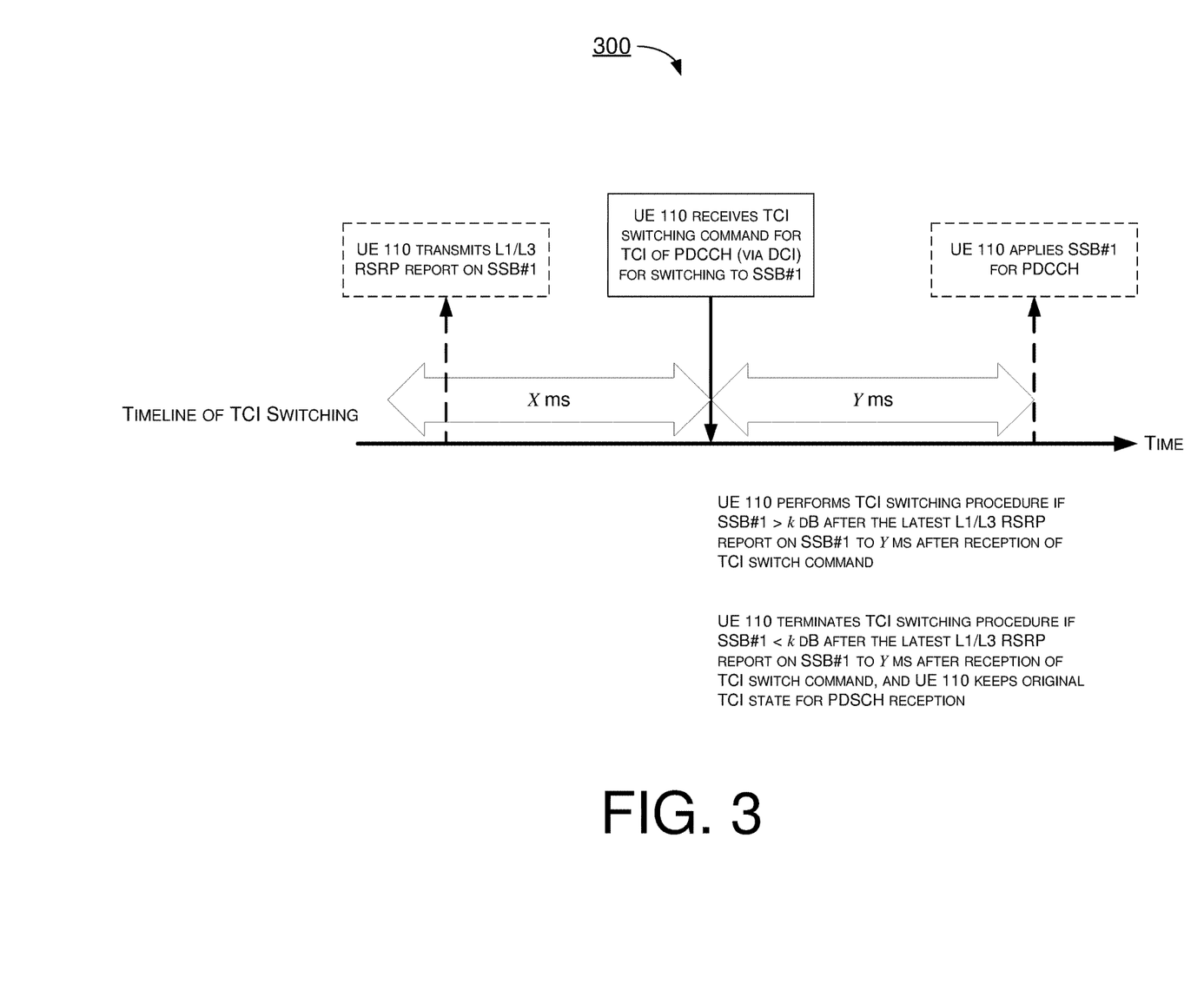
FIG. 3 is a diagram of an example scenario in accordance with an implementation of the present disclosure.
Figure 4:
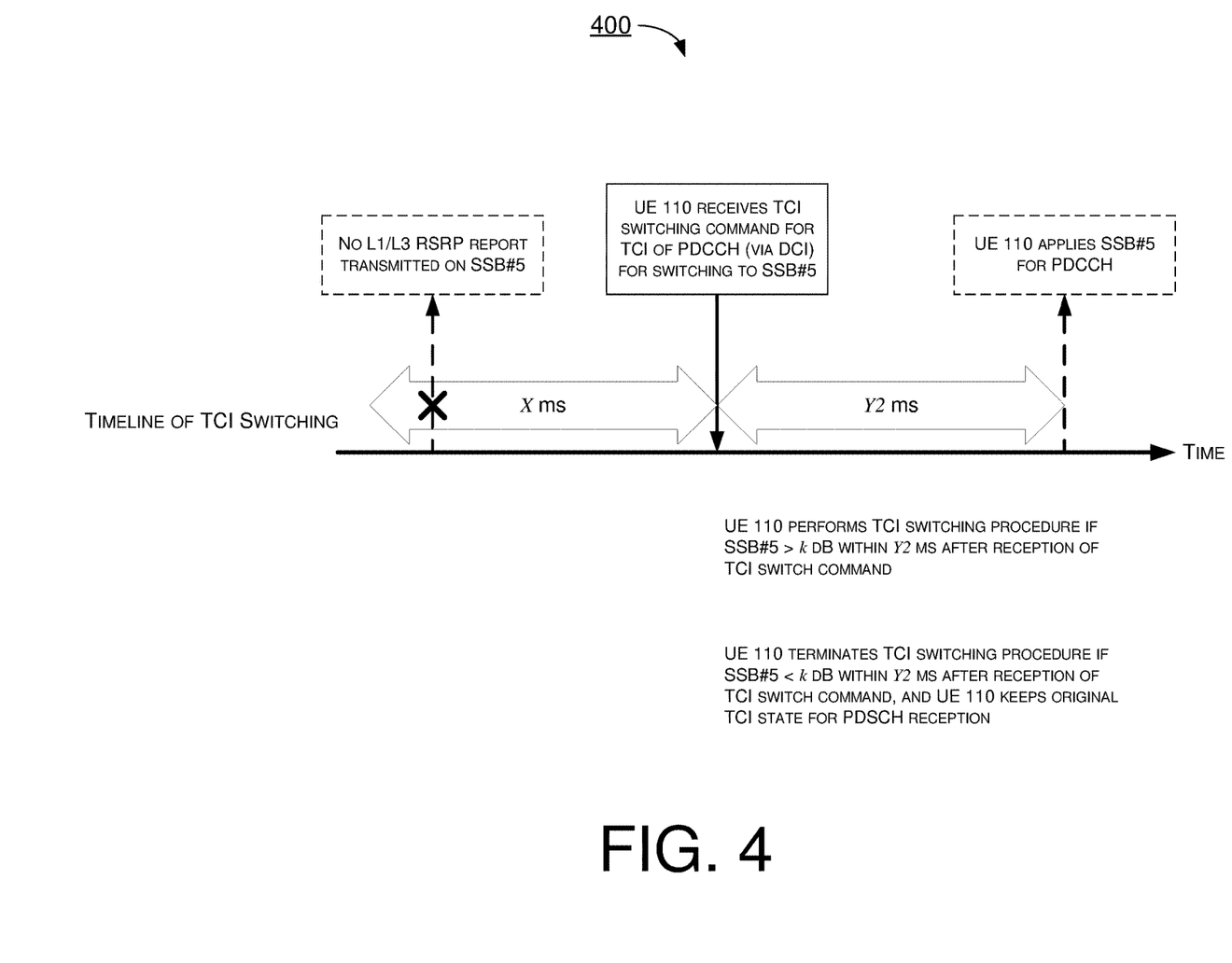
FIG. 4 is a diagram of an example scenario in accordance with an implementation of the present disclosure.

FIG. 1 illustrates an example network environment 100 in which various solutions and schemes in accordance with the present disclosure may be implemented. FIG. 2, FIG. 3 and FIG. 4 illustrate example scenarios 200, 300 and 400, respectively, in accordance with implementations of the present disclosure. Each of scenarios 200, 300 and 400 may be implemented in network environment 100. The following description of various proposed schemes is provided with reference to FIG. 1~FIG. 4.

Referring to FIG. 1, network environment 100 may involve a UE 110 in wireless communication with a wireless network 120 (e.g., a 5G NR mobile network). UE 110 may be in wireless communication with wireless network 120 via a base station or network node 125 (e.g., an eNB, gNB or transmit-receive point (TRP)) and perform a TCI switching procedure based on any of the proposed schemes in accordance with the present disclosure, as described herein.

Under various proposed schemes in accordance with the present disclosure, UE 110 may perform the TCI switching procedure to switch to a target TCI state when one or more conditions are met. Such conditions may include, for example and without limitation, (1) a latest Layer 1 (L1) or Layer 3 (L3) RSRP report with a synchronization signal block (SSB) index having been transmitted to wireless network 120 within a predefined amount of time before UE 110 receiving a TCI switch command from wireless network 120, (2) a signal-to-noise ratio (SNR) level of a reference signal (RS) in a set of parameters of the target TCI state being higher than a threshold level, and (3) the set of parameters of the target TCI state is indicated in a TCI activation table or list.

Under various proposed schemes in accordance with the present disclosure, a TCI switching procedure may be performed, executed or otherwise carried out in a number of steps or stages as described below. Under a proposed scheme, UE 110 may transmit a L1 or L3 RSRP report to network node 125 of wireless network 120. Then, UE 110 may receive a TCI switch command from network node 125. In response, UE 110 may determine a period based on whether one or more of aforementioned conditions is/are met. For instance, UE 110 may determine whether a latest L1 or L3 RSRP report with a SSB index has been transmitted to wireless network 120 within a predefined amount of time (e.g., 80 ms, 160 ms or 320 ms) before receiving the TCI switch command. Alternatively, or additionally, UE 110 may determine whether a SNR level of a RS in a set of parameters of the target TCI state being higher than a threshold level (e.g., −3 dB). Alternatively, or additionally, UE 110 may determine whether a set of parameters of the target TCI state is indicated in a TCI activation table or list.

Under the proposed scheme, the period may be a first period (e.g., Y ms) in an event that all the following conditions are met: (1) a latest L1 or L3 RSRP report with a SSB index has been transmitted to the wireless network within a predefined amount of time before receiving the TCI switch command, (2) a SNR level of a RS in a set of parameters of the target TCI state is higher than a threshold level, and (3) the set of parameters of the target TCI state is indicated in a TCI activation table or list. For a DCI-based TCI switching, the first period may be based on a time duration for quasi-co-location association (timeDurationForQCL). For a MAC-based TCI switching, the first period may be based on a hybrid automatic repeat request (HARQ) decoding time plus a medium access control (MAC) control element (CE) decoding time.

Under the proposed scheme, the period may be a second period (e.g., Y2 ms) in an event that either of the following conditions is met: (1) a latest L1 or L3 RSRP report with a SSB index has not been transmitted to the wireless network within a predefined amount of time before receiving the TCI switch command, and (2) a SNR level of a RS in a set of parameters of the target TCI state being lower than a threshold level. For a DCI-based TCI switching, the second period may be based on a time duration for quasi-co-location association (timeDurationForQCL) and a time duration for performing receive (RX) beam refinement and fine synchronization based on a SSB. For a MAC-based TCI switching, the second period may be based on a HARQ decoding time plus a MAC CE decoding time and a time duration for performing RX beam refinement and fine synchronization based on a SSB.

As an example, for DCI-based TCI switching (e.g., PDSCH), UE 110 may apply the target TCI state within a period of time denoted by Y=UE capability based on a time duration for QCL association (timeDurationForQCL). As another example, for MAC-based TCI switching (e.g., PDCCH), UE 110 may apply the target TCI state within a period of time denoted by Y=N1+a ms, with N1 denoting a HARQ decoding time and a denoting a MAC CE decoding time. As yet another example, for RRC-based TCI switching, UE 110 may apply the target TCI state within a period of time denoted by Y which includes the time period for aforementioned procedures. In such cases, UE 110 may first perform RX beam refinement and fine synchronization based on a SSB and then apply the target TCI state.

Referring to FIG. 2, in scenario 200, UE 110 may receive a TCI switch command from network node 125 instructing UE 110 to switch from a current TCI state to a target TCI state. Accordingly, UE 110 may determine that a condition is met for switching to the target TCI state in an event that the target TCI state is in a TCI activation table or list. For instance, UE 110 may determine that the condition is met when a RS in the target TCI state is SSB #1 while the TCI activation table/list includes SSB #1, SSB #2, SSB #3 and SSB #4. For DCI-based TCI switching (e.g., for PDSCH), in an event that a SNR level of SSB #1 has been higher than k dB for RX beam #1, UE 110 may perform TCI switching and apply the new (target) TCI state for PDSCH within Y ms after reception of the TCI switch command. As an example, k dB may be −3 dB, −2 dB or 0 dB, and Y=UE capability based on timeDurationForQCL. In an event that the SNR level of the target TCL state becomes lower than k dB for RX beam #1 within Y ms after reception of the TCI switch command, UE 110 may terminate the TCI switching procedure.

Referring to FIG. 3, in scenario 300, UE 110 may receive a TCI switch command from network node 125 instructing UE 110 to switch from a current TCI state to a target TCI state. Accordingly, UE 110 may determine that a condition is met for switching to the target TCI state is met in an event that UE 110 has transmitted a corresponding L1 or L3 RSRP report of the target TCI state (e.g., SSB #1) within X ms with RX beam #1. As an example, X ms may be 80 ms, 160 ms, 320 ms or 1280 ms. For MAC-based TCI switching (e.g., for PDCCH), in an event that a SNR level of SSB #1 has been higher than k dB for RX beam #1, UE 110 may perform TCI switching and apply the new (target) TCI state (e.g., SSB #1) for PDCCH within Y ms after reception of the TCI switch command. As an example, Y ms=N1+a ms. Here, N1 may denote the HARQ decoding time (e.g., for 14 orthogonal frequency-division multiplexing (OFDM) symbols) and a may denote the MAC CE decoding time (e.g., 3 ms). In an event that the SNR level of SSB #1 becomes lower than k dB for RX beam #1, after the latest L1 or L3 RSRP report on SSB #1 to Y ms after reception of the TCI switch command, UE 110 may terminate the TCI switching procedure.

Referring to FIG. 4, in scenario 400, UE 110 may receive a TCI switch command from network node 125 instructing UE 110 to switch from a current TCI state to a target TCI state. Accordingly, UE 110 may determine that a condition is met for switching to the target TCI state is not met in an event that UE 110 has not transmitted a corresponding L1 or L3 RSRP report of the target TCI state (e.g., SSB #5) within X ms and SSB #5 is not in the TCI activation table or list. As an example, X ms may be 80 ms, 160 ms, 320 ms or 1280 ms. UE 110 may perform RX beam training and timing synchronization for SSB #5 within Y2 ms (e.g., Y2=2 to 4 SSB periodicities). For MAC-based TCI switching (e.g., for PDCCH), in an event that a SNR level of SSB #5 has been higher than k dB for RX beam #1, UE 110 may perform TCI switching and apply the new (target) TCI state (e.g., SSB #5) for PDCCH within Y2 ms after reception of the TCI switch command. In an event that the SNR level of SSB #5 becomes lower than k dB for RX beam #1, within Y2 ms after reception of the TCI switch command, UE 110 may terminate the TCI switching procedure.

Illustrative Implementations

Figure 5:
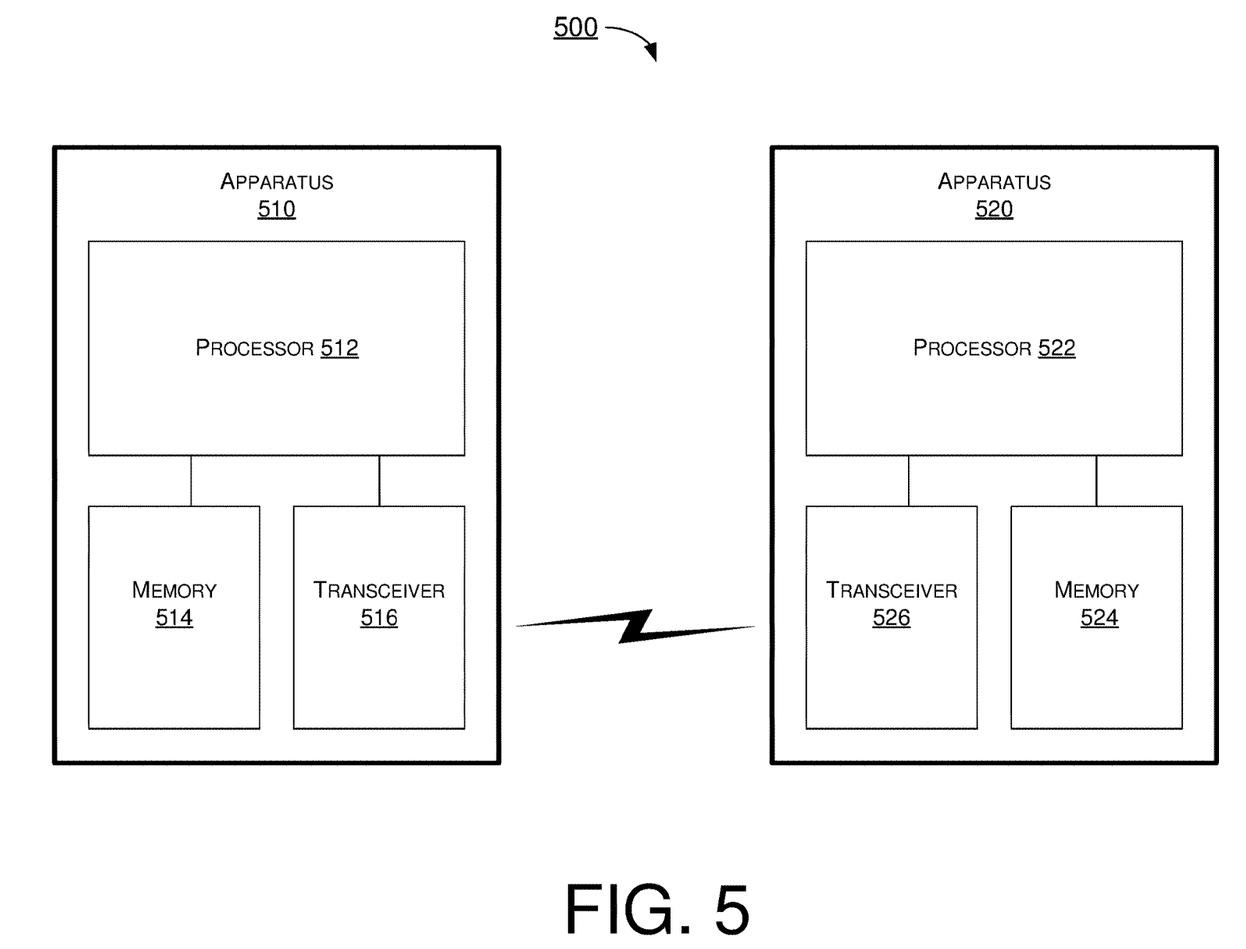
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to a TCI switching procedure in NR mobile communications, including the various schemes described above with respect to various proposed designs, concepts, schemes, systems and methods described above as well as processes described below. For instance, apparatus 510 may be an example implementation of UE 110, and apparatus 520 may be an example implementation of network node 125.

Each of apparatus 510 and apparatus 520 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node (e.g., network node 125), such as an eNB in an LTE, LTE-Advanced or LTE-Advanced Pro network or in a gNB or TRP in a 5G network, an NR network or an IoT network.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a network apparatus or a UE. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to a TCI switching procedure in NR mobile communications in accordance with various implementations of the present disclosure.

In some implementations, apparatus 510 may also include a transceiver 516 coupled to processor 512. Transceiver 516 may be capable of wirelessly transmitting and receiving data. In some implementations, apparatus 520 may also include a transceiver 526 coupled to processor 522. Transceiver 526 may include a transceiver capable of wirelessly transmitting and receiving data.

In some implementations, apparatus 510 may further include a memory 514 coupled to processor 512 and capable of being accessed by processor 512 and storing data therein.

In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (FeRAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as a UE, and apparatus 520, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 510 as a UE (e.g., UE 110), the same is also applicable to apparatus 520 as a network node or base station such as a gNB, TRP or eNodeB (e.g., network node 125) of a wireless network (e.g., wireless network 120) such as a 5G NR mobile network.

Under a proposed scheme in accordance with the present disclosure, processor 512 of apparatus 510 may receive, via transceiver 516, from a wireless network (e.g., wireless network 120) via apparatus 520 as network node 125 a TCI switch command to switch to a target TCI state. Moreover, processor 512 may determine a period based on whether a condition with respect to the target TCI state is met. Furthermore, processor 512 may complete a TCI switching procedure by switching to the target TCI state within the period.

In some implementations, in determining the period based on whether the condition with respect to the target TCI state is met, processor 512 may determine whether a latest L1 or L3 RSRP report with a SSB index has been transmitted to the wireless network within a predefined amount of time before receiving the TCI switch command.

Alternatively, or additionally, in determining the period based on whether the condition with respect to the target TCI state is met, processor 512 may determine whether a SNR level of a RS in a set of parameters of the target TCI state being higher than a threshold level.

Alternatively, or additionally, in determining the period based on whether the condition with respect to the target TCI state is met, processor 512 may determine whether a set of parameters of the target TCI state is indicated in a TCI activation table or list.

In some implementations, the period may be a first period in an event that all the following conditions are met: (1) a latest L1 or L3 RSRP report with a SSB index has been transmitted to the wireless network within a predefined amount of time before receiving the TCI switch command, (2) a SNR level of a RS in a set of parameters of the target TCI state is higher than a threshold level, and (3) the set of parameters of the target TCI state is indicated in a TCI activation table or list.

In some implementations, for a DCI-based TCI switching, the first period may be based on a time duration for quasi-co-location association (timeDurationForQCL).

In some implementations, for a MAC-based TCI switching, the first period may be based on a HARQ decoding time plus a MAC CE decoding time.

In some implementations, the period may be a second period in an event that either of the following conditions is met: (1) a latest L1 or L3 RSRP report with a SSB index has not been transmitted to the wireless network within a predefined amount of time before receiving the TCI switch command, or (2) a SNR level of a RS in a set of parameters of the target TCI state being lower than a threshold level.

In some implementations, for a DCI-based TCI switching, the second period may be based on a time duration for quasi-co-location association (timeDurationForQCL) and a time duration for performing RX beam refinement and fine synchronization based on a SSB.

In some implementations, for a MAC-based TCI switching, the second period may be based on a HARQ decoding time plus a MAC CE decoding time and a time duration for performing RX beam refinement and fine synchronization based on a SSB.

Illustrative Processes

Figure 6:
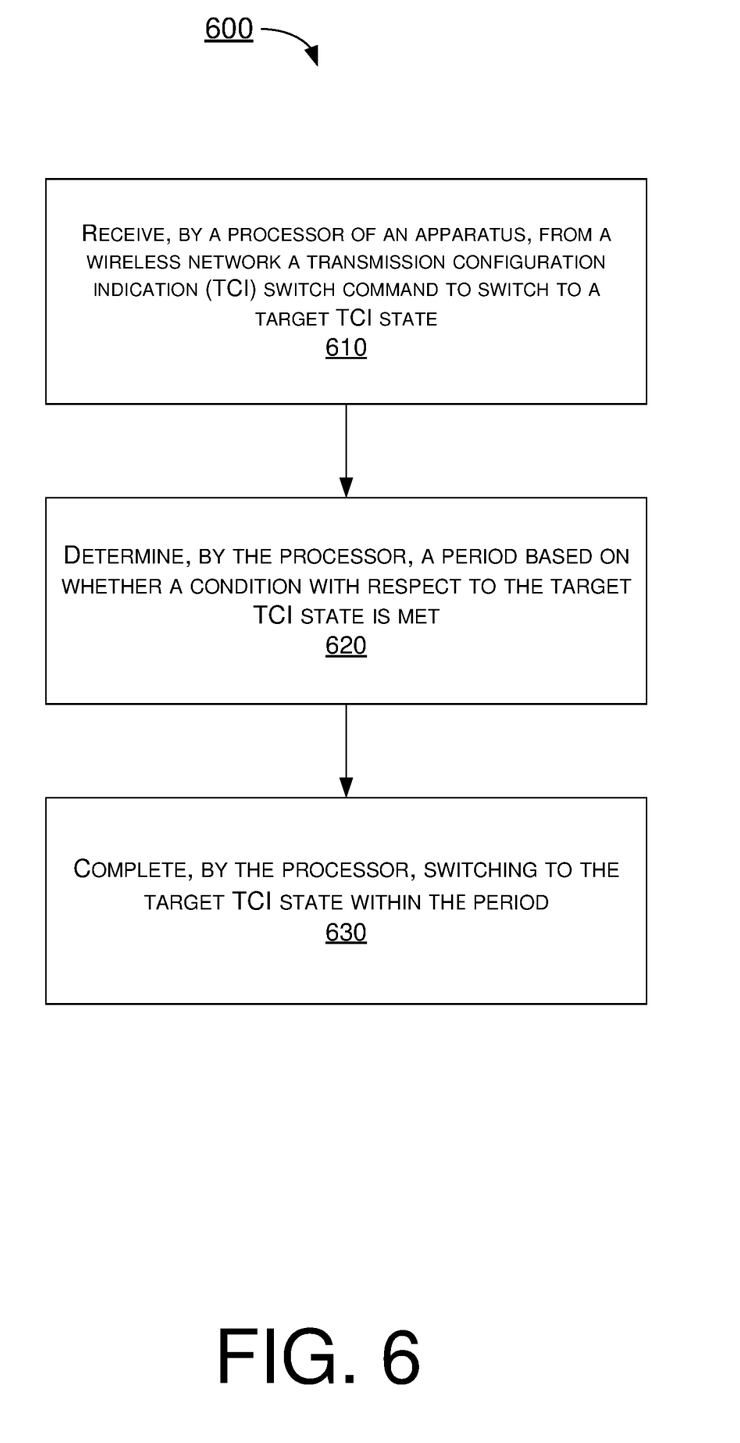
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to a TCI switching procedure in NR mobile communications in accordance with the present disclosure. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 as a UE (e.g., UE 110) and apparatus 520 as a network node (e.g., network node 125) of a wireless network (e.g., wireless network 120) such as a 5G/NR mobile network. Process 600 may begin at block 610.

At 610, process 600 may involve processor 512 of apparatus 510 receiving, via transceiver 516, from a wireless network (e.g., wireless network 120) via apparatus 520 as network node 125 a TCI switch command to switch to a target TCI state. Process 600 may proceed from 610 to 620.

At 620, process 600 may involve processor 512 determining a period based on whether a condition with respect to the target TCI state is met. Process 600 may proceed from 620 to 630.

At 630, process 600 may involve processor 512 completing switching to the target TCI state within the period.

In some implementations, in determining the period based on whether the condition with respect to the target TCI state is met, process 600 may involve processor 512 determining whether a latest L1 or L3 RSRP report with a SSB index has been transmitted to the wireless network within a predefined amount of time before receiving the TCI switch command.

Alternatively, or additionally, in determining the period based on whether the condition with respect to the target TCI state is met, process 600 may involve processor 512 determining whether a SNR level of a RS in a set of parameters of the target TCI state being higher than a threshold level.

Alternatively, or additionally, in determining the period based on whether the condition with respect to the target TCI state is met, process 600 may involve processor 512 determining whether a set of parameters of the target TCI state is indicated in a TCI activation table or list.

In some implementations, the period may be a first period in an event that all the following conditions are met: (1) a latest L1 or L3 RSRP report with a SSB index has been transmitted to the wireless network within a predefined amount of time before receiving the TCI switch command, (2) a SNR level of a RS in a set of parameters of the target TCI state is higher than a threshold level, and (3) the set of parameters of the target TCI state is indicated in a TCI activation table or list.

In some implementations, for a DCI-based TCI switching, the first period may be based on a time duration for quasi-co-location association (timeDurationForQCL).

In some implementations, for a MAC-based TCI switching, the first period may be based on a HARQ decoding time plus a MAC CE decoding time.

In some implementations, the period may be a second period in an event that either of the following conditions is met: (1) a latest L1 or L3 RSRP report with a SSB index has not been transmitted to the wireless network within a predefined amount of time before receiving the TCI switch command, or (2) a SNR level of a RS in a set of parameters of the target TCI state being lower than a threshold level.

In some implementations, for a DCI-based TCI switching, the second period may be based on a time duration for quasi-co-location association (timeDurationForQCL) and a time duration for performing RX beam refinement and fine synchronization based on a SSB.

In some implementations, for a MAC-based TCI switching, the second period may be based on a HARQ decoding time plus a MAC CE decoding time and a time duration for performing RX beam refinement and fine synchronization based on a SSB.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, from a wireless network a transmission configuration indication (TCI) switch command to switch to a target TCI state;
determining, by the processor, a period based on whether a condition with respect to the target TCI state is met; and
completing, by the processor, switching to the target TCI state within the period,
wherein the period is a first period in an event that a latest Layer 1 (L1) reference signal received power (RSRP) report has been transmitted to the wireless network within a predefined amount of time before receiving the TCI switch command, a signal-to-noise ratio (SNR) level of a reference signal (RS) in a set of parameters of the target TCI state is higher than a threshold level, and the set of parameters of the target TCI state is indicated in a TCI activation table or list.

2. The method of claim 1, wherein, for a downlink control information (DCI)-based TCI switching, the first period is based on a time duration for quasi-co-location association (timeDurationForQCL).

3. The method of claim 1, wherein, for a medium access control (MAC)-based TCI switching, the first period is based on a hybrid automatic repeat request (HARQ) decoding time plus a MAC control element (CE) decoding time.

4. A method, comprising:
receiving, by a processor of an apparatus, from a wireless network a transmission configuration indication (TCI) switch command to switch to a target TCI state;
determining, by the processor, a period based on whether a condition with respect to the target TCI state is met; and
completing, by the processor, switching to the target TCI state within the period,
wherein the period is a second period in an event that a latest Layer 1 (L1) reference signal received power (RSRP) report has not been transmitted to the wireless network within a predefined amount of time before receiving the TCI switch command, or a signal-to-noise ratio (SNR) level of a reference signal (RS) in a set of parameters of the target TCI state being lower than a threshold level,
wherein, for a medium access control (MAC)-based TCI switching, the second period is based on a hybrid automatic repeat request (HARQ) decoding time plus a MAC control element (CE) decoding time and a time duration for performing receive (RX) beam refinement and fine synchronization based on a synchronization signal block (SSB).

5. An apparatus, comprising:
a transceiver configured to communicate wirelessly; and
a processor coupled to the transceiver and configured to perform operations comprising:
receiving, via the transceiver, from a wireless network a transmission configuration indication (TCI) switch command to switch to a target TCI state;
determining a period based on whether a condition with respect to the target TCI state is met; and
completing switching to the target TCI state within the period,
wherein the period is a first period in an event that a latest Layer 1 (L1) reference signal received power (RSRP) report has been transmitted to the wireless network within a predefined amount of time before receiving the TCI switch command, a signal-to-noise ratio (SNR) level of a reference signal (RS) in a set of parameters of the target TCI state is higher than a threshold level, and the set of parameters of the target TCI state is indicated in a TCI activation table or list.

6. The apparatus of claim 5, wherein, for a downlink control information (DCI)-based TCI switching, the first period is based on a time duration for quasi-co-location association (timeDurationForQCL).

7. The apparatus of claim 5, wherein, for a medium access control (MAC)-based TCI switching, the first period is based on a hybrid automatic repeat request (HARQ) decoding time plus a MAC control element (CE) decoding time.

* * * * *